(12) United States Patent
Cooper et al.

(10) Patent No.: US 6,375,880 B1
(45) Date of Patent: Apr. 23, 2002

(54) MOLD SHAPE DEPOSITION MANUFACTURING

(75) Inventors: Alexander G. Cooper, Stanford; John W. Kietzman, Redwood City; Friedrich B. Prinz, Menlo Park, all of CA (US)

(73) Assignee: The Board of Trustees of the Leland Stanford Junior University, Stanford, CA (US)

( * ) Notice: Subject to any disclaimer, the term of this patent is extended or adjusted under 35 U.S.C. 154(b) by 0 days.

(21) Appl. No.: 09/164,415

(22) Filed: Sep. 30, 1998

Related U.S. Application Data

(60) Provisional application No. 60/061,616, filed on Sep. 30, 1997.

(51) Int. Cl.[7] .......................... B29C 33/38; B29C 39/02
(52) U.S. Cl. ...................... 264/138; 264/221; 264/317; 264/318; 264/219
(58) Field of Search ................................ 264/219, 221, 264/344, 313, 317, 318, 138

(56) References Cited

U.S. PATENT DOCUMENTS

| | | | | |
|---|---|---|---|---|
| 3,617,369 | A | * 11/1971 | Lombardo | 264/338 |
| 4,247,508 | A | * 1/1981 | Housholder | 264/219 |
| 4,556,528 | A | 12/1985 | Gersch et al. | 264/221 |
| 4,894,194 | A | 1/1990 | Janney | 264/109 |
| 5,028,362 | A | 7/1991 | Janney et al. | 264/25 |
| 5,121,329 | A | 6/1992 | Crump | 364/468 |
| 5,145,908 | A | 9/1992 | Jenny et al. | 524/827 |
| 5,204,055 | A | * 4/1993 | Sachs et al. | 419/2 |
| 5,252,273 | A | 10/1993 | Sakai et al. | 264/86 |
| 5,286,573 | A | 2/1994 | Prinz et al. | 428/457 |
| 5,301,415 | A | 4/1994 | Prinz et al. | 29/458 |
| 5,362,427 | A | 11/1994 | Mitchell, Jr. | 364/22 |
| 5,387,380 | A | * 2/1995 | Cima et al. | 264/123 |
| 5,401,445 | A | 3/1995 | Menchhofer | 264/13 |
| 5,419,860 | A | 5/1995 | Menchhofer | 264/63 |
| 5,476,622 | A | 12/1995 | Moorhead et al. | 264/63 |
| 5,503,785 | A | 4/1996 | Crump et al. | 264/40.7 |
| 5,590,454 | A | 1/1997 | Richardson | 29/527.4 |
| 5,594,652 | A | 1/1997 | Penn et al. | 364/468.26 |
| 5,735,985 | A | * 4/1998 | Ghosh et al. | 264/220 |
| 5,788,916 | A | * 8/1998 | Caldarise | 264/221 |
| 5,824,250 | A | 10/1998 | Whalen et al. | 264/219 |
| 6,070,107 | A | * 5/2000 | Lombardi et al. | 264/40.7 |

OTHER PUBLICATIONS

Jamalabad, V. et al., *Gelcast molding with rapid prototyped fugitive molds*, Solid Fabrication Symposium Proceedings, Austin, TX, pp. 71–78, Aug. 1996.

Krause, C., *ORNL's gelcasting: molding the future of ceramic forming?*, Oak Ridge National Laboratory Review, No. 4, pp. 25–39, 1995.

PatternMaster™ and ModelMaker™ 3D Modeling Systems made by Solidscape Inc., Information source: WWW.solid–scape.com (undated).

* cited by examiner

Primary Examiner—Allan R. Kuhns
(74) Attorney, Agent, or Firm—Lumen Intellectual Property Services, Inc.

(57) ABSTRACT

A method of making molded parts employing Shape Deposition Manufacturing (SDM) techniques. First, SDM processes are used to make a layered structure having support segments and mold segments. The support segments are made of material which may be removed from the mold segments (e.g. dissolved or melted). The mold segments are made of a material which can function as a mold. The mold and support segments are sequentially deposited (e.g. in layers) and shaped (e.g. machined) to form a mold. The support segments define the shape of the part to be manufactured. The mold segments are removed from the support segments by dissolving or melting away the support segments, leaving an empty mold. Then, part material is cast into the empty mold. The mold is removed, providing a molded part. The part material can be a gelcasting slurry, for example. The present method provides homogeneous or heterogeneous parts having shapes which are accurately defined by the SDM process.

83 Claims, 3 Drawing Sheets

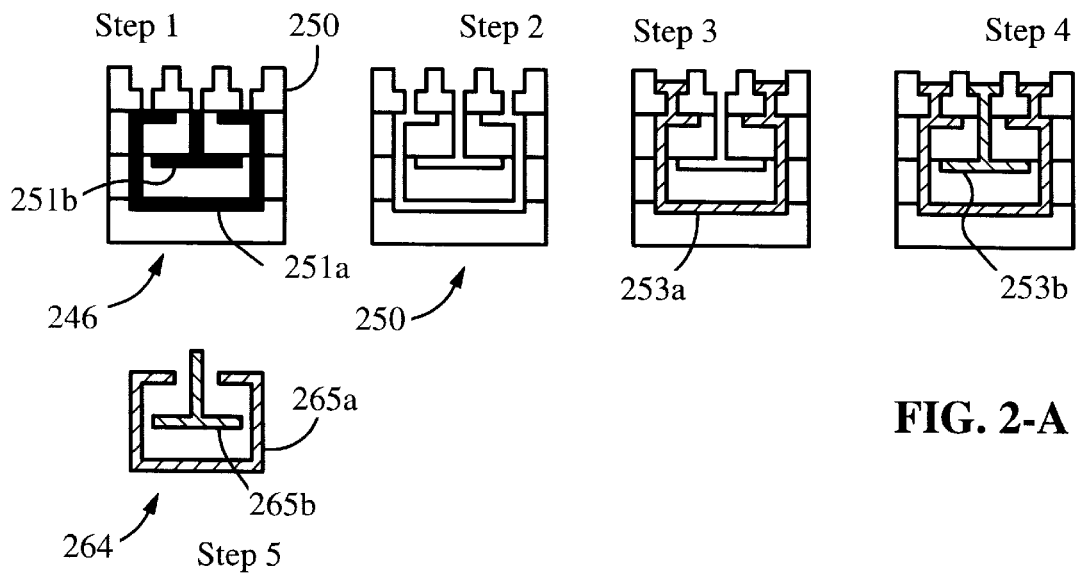
FIG. 2-A
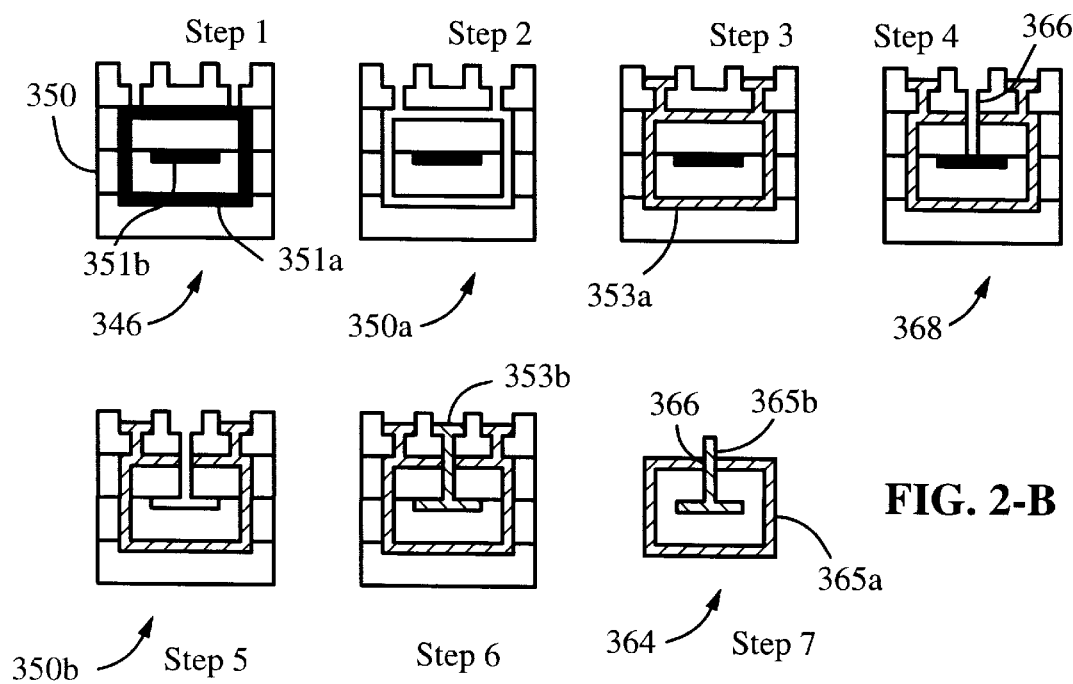
FIG. 2-B

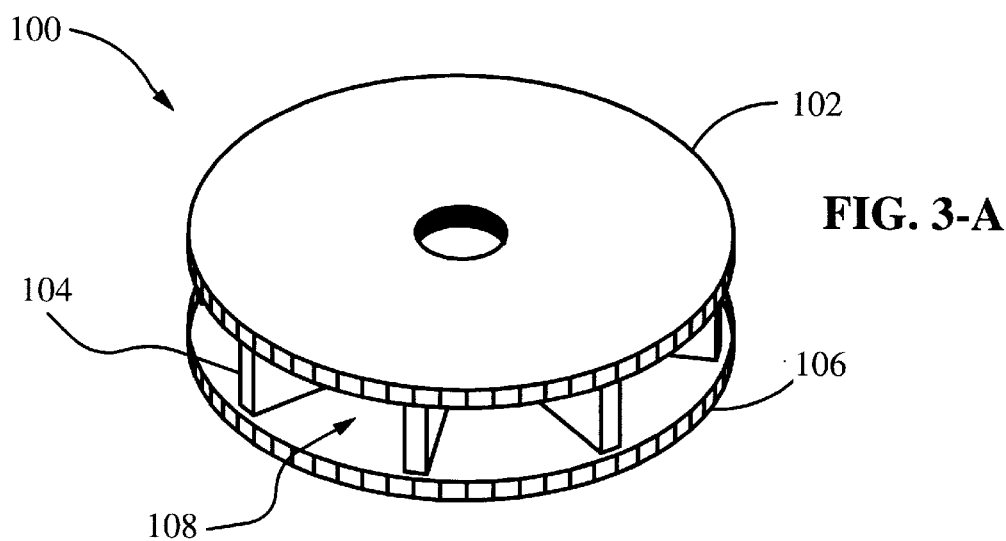
FIG. 3-A
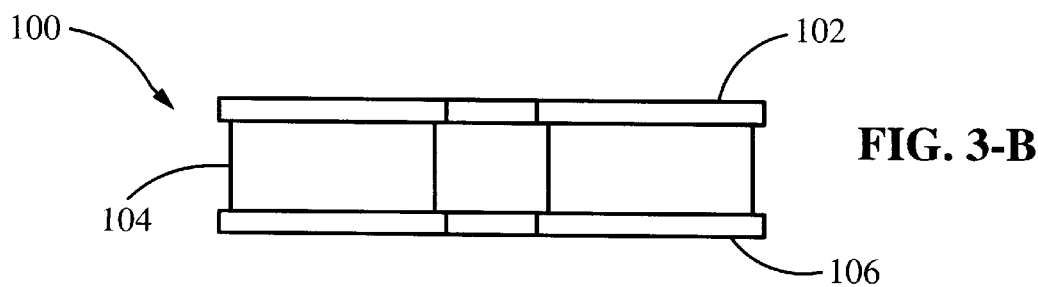
FIG. 3-B

MOLD SHAPE DEPOSITION MANUFACTURING

CROSS-REFERENCE TO RELATED APPLICATIONS

This application is based on Provisional application 60/061,616 filed Sep. 30, 1997 which is herein incorporated by reference.

U.S. GOVERNMENT RIGHTS

This invention was made with U.S. Government support under contract No. N00014-96-I-0625 awarded by the Department of the Navy. The U.S. Government has certain rights in this invention.

BACKGROUND OF THE INVENTION

This invention relates to a method for rapidly fabricating complex three-dimensional ceramic, metal and polymer parts, and in particular to a method of making molded parts using complex fugitive molds built using a layered manufacturing process.

The following discussion will treat ceramic part production in detail; many of the problems facing the manufacture of ceramic parts are also encountered in the manufacture of polymer and metal parts.

A number of techniques and processes have been used for making complex three-dimensional ceramic parts. Prior art methods of making relatively simple ceramic parts include powder pressing, slip casting, tape casting, and extrusion. Slip casting and tape casting produce relatively fragile "green" (not yet sintered) parts. For information on slip-casting, see U.S. Pat. Nos. 4,556,528 and 5,252,273. Extrusion requires high binder content in the green material which leads to lengthy and difficult burn out cycles. Complex parts can be made by machining of green ceramic billets or by injection molding. The abrasivity of ceramic green materials makes machining expensive due to rapid tool and machine wear. Injection molding requires expensive, long-leadtime tooling and produces green parts with high binder content.

Rapid prototyping methods allow the fabrication of complex near-net shapes without the need for tooling. For information on rapid prototyping processes for making green ceramic parts, see "Indirect Fabrication of Metals and Ceramics," Chapter 5 in *Solid Freeform Fabrication: A New Direction in Manufacturing*, Beaman et al., Dordrecht: Kluwer Academic Publishers, 1997. By producing near-net-shape parts these processes can reduce or eliminate the need for green machining. However, they typically produce parts that exhibit a stairstep surface as a result of being built incrementally in layers. While the outside surfaces of green parts made by such processes could be manually smoothed, there is no way to smooth inaccessible interior surfaces. Since the parts are built in layers there is also a potential for defects at the layer boundaries.

Gelcasting is a relatively new ceramic forming process. For general information on gelcasting see the article by Krause "ORNL's Gelcasting: Molding the Future of Ceramic Forming?", *Oak Ridge National Laboratory Review*, No. 4, 1995, pp. 25–39. Further information on gelcasting may be found in U.S. Pat. Nos. 4,894,194, 5,028,362, 5,145,908, 5,476,622, 5,401,445, and 5,419,860. Gelcast green parts have a relatively low binder content and are strong enough to be machined if necessary. Repeatable isotropic shrinkage allows gelcast parts to be made correspondingly larger than the desired fired parts, so that the parts shrink to the proper size during sintering. To make complex parts, gelcasting can be used either with fugitive or non-fugitive molds.

Non-fugitive-mold gelcasting typically uses metal molds, but since these are used at low pressures they will last longer than injection molds. However, metal molds are expensive, have significant leadtimes, and can only produce molded parts of limited shape complexity.

In fugitive-mold gelcasting, metal molds are used to produce wax molds which are then used for gelcasting. Since the metal tooling is only used with waxes it will last a long time, but the tooling is expensive and may have substantial leadtimes. The replication step from metal molds to wax molds also reduces the accuracy of the gelcast part.

By using rapid prototyping techniques to build molds for gelcasting one could eliminate the need for expensive, long-leadtime tooling. For information on making complicated gelcast structures using molds made by Fused Deposition Modeling (FDM), see the article by Jamalabad et al. "Gelcast Molding with Rapid Prototyped Fugitive Molds," *Solid Freeform Fabrication Symposium Proceedings*, Austin Tex., August 1996, pp. 71–78. However, conventional rapid prototyping techniques (including FDM) produce parts with a stairstep surface, and there is no way to smooth the internal surfaces of a mold made by such a process. Also because of material limitations, molds made by most rapid prototyping processes would be very difficult or impossible to remove from around gelcast green parts without damaging the green parts.

Many of the problems facing the above-described processes for making ceramic parts also affect the manufacture of complex polymer and metal parts. Current rapid prototyping methods of making complex polymer parts are limited in the types of polymers that can be used. Parts made by conventional rapid prototyping processes also suffer from stairsteps and other geometrical artifacts which reduce surface quality.

OBJECTS AND ADVANTAGES

It is a primary object of the present invention to provide a method of making parts having complex shapes including internal passages and undercuts. It is another object to allow making complex parts with high accuracy, in particular without requiring multiple replication steps. It is another object to provide a method of making molded parts having improved surface finish. It is another object to allow the manufacture of complex monolithic parts without interlayer boundaries. It is another object to provide a method allowing the manufacture of complex molded parts of a relatively wide range of materials, including materials having superior mechanical properties. The present invention allows the use of mold/support material combinations not possible with other layered manufacturing processes, including solvent-soluble wax mold materials and water-soluble support materials for molds. The present invention also allows the manufacture of complex parts made of materials which do not adhere to themselves (i.e. sequentially deposited layers would not adhere to themselves). It is another object to provide a method allowing for the removal of molds from around molded parts without the application of force, thus allowing the production of undercut or fragile parts which would be otherwise either nonremovable or easily damaged. It is another object to provide a method for removal of molded parts from molds which requires no handwork. It is yet another object to provide a method of making heterogeneous molded parts containing multiple materials (provided the materials have compatible sintering or processing requirements), such as polymer/polymer, ceramic/ceramic, metal/metal, or ceramic/metal parts.

SUMMARY OF THE INVENTION

The above objects and advantages are provided by the following method of making molded parts. The present method begins with sequentially depositing and shaping a number of mold layers. At least one of the mold layers includes a support segment made of support material. This process of depositing and shaping the mold layers produces a mold filled with support material. The support material is removed by liquefying it (e.g., melting or dissolving the support material). This provides an empty mold cavity for receiving castable part material such as a gelcasting slurry. Casting part material into the mold produces a part having the shape of the mold cavity. The part is removed from the mold by liquefying the mold (e.g. melting or dissolving the mold).

The support material can be liquefied by melting or dissolving in a solvent which does not affect the mold material. The support material and mold material must be different so that the support material can be liquefied without affecting the mold material.

The shaping of the mold layers can be performed such that the mold has an undercut surface. This can be accomplished by depositing and shaping support material and then depositing overhanging mold material. Combinations of undercut and non-undercut mold segments or support segments provide a mold for complex parts.

The method of the present invention can provide molds for simultaneously producing a plurality of parts. In this embodiment, the support segments define a number of cavities in the mold corresponding to the different parts to be cast. Each cavity is filled with castable material. If desired, the different cavities are filled with different castable materials. Also, the different cavities can be interlocking. In this way, interlocking parts each made of different materials can be fabricated.

DESCRIPTION OF THE FIGURES

FIG. 2-A is a schematic diagram illustrating a process for making a heterogeneous molded part comprising two interlocked sections, according to the present invention.

FIG. 2-B is a schematic diagram illustrating a process for making a heterogeneous molded part comprising two directly connected sections, according to the present invention.

FIG. 3-A illustrates in a perspective view the geometry of a part manufactured using a method of the present invention.

FIG. 3-B is a side sectional view of the part of FIG. 3-A.

DETAILED DESCRIPTION

Figure 1:
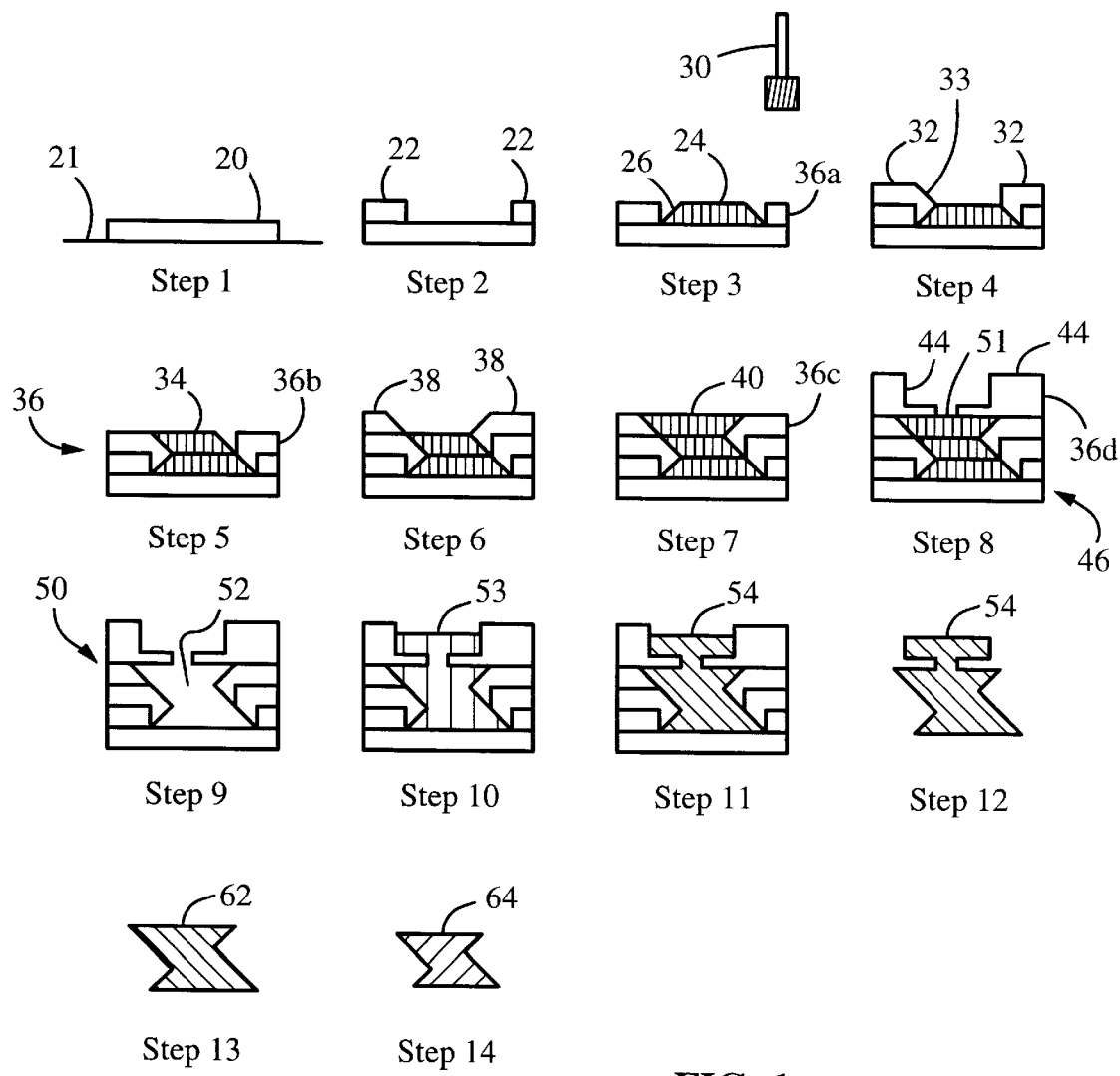
FIG. 1 illustrates schematically the manufacture of a three-dimensional structure having various undercuts, according to the present invention.

Shape Deposition Manufacturing (SDM) is a layered manufacturing process for making complex objects. The process has been used for the direct manufacture of metal and polymer (e.g. polyurethane) objects. For information on SDM see U.S. Pat. Nos. 5,301,415, 5,286,573, 5,278,442, 5,207,371, 5,203,944, and 5,126,529, all of which are herein incorporated by reference. For information on the use of SDM for the manufacture of complex heterogeneous structures see the article by Weiss et al. in SME *Journal of Manufacturing Systems* (Special Issue on Layered Manufacturing), ed. D. Dutta, p. 1–14, June 1997, herein incorporated by reference.

Rather than making an object by sculpting it out of a solid block, or making an object by casting it into a hollow mold, SDM uses a cyclic combination of these two methods to make objects with complicated geometry which could not necessarily be made in other ways. Material deposition is accomplished through a variety of means, depending upon the material being deposited; material removal is usually accomplished through, for example, three- or five-axis milling, although other processes are used for some materials. The process involves a part material and a sacrificial support material. The final object is made of the part material; the sacrificial material is used to support overhanging features while the object is being built, and is removed (dissolved or melted) when the object is finished.

The process begins with the construction of a support material cavity shaped like the underside of the desired object. Part material is deposited into this cavity; this will be the bottom layer of the object. If necessary, additional features are milled into the exposed part material. Additional support material is deposited to surround the bottom layer of part material, and to surround the next layer of the object. This support material is then milled to complement the second layer of the object. More part material is deposited into the complementary cavity defined by the support material, and the process continues until the rest of the object is deposited and milled. At this point, the whole object has been constructed, but it is embedded in a block of support material. To complete the process, the sacrificial support material is removed, leaving the finished part.

The major advantage of SDM is that it allows the construction of complex parts such as multimaterial structures or assembled mechanisms, which would be difficult or impossible to make using conventional processes such as machining or casting. An example of a multimaterial structure is a steel injection molding tool with conformal embedded copper sections to improve the heat-transfer properties of the tool and therefore reduce cycle times. An example of an assembled structure is a crank-slider mechanism built as a single unit.

Compared to other layered manufacturing (or rapid prototyping) techniques, SDM has the advantage of creating features through material addition and removal rather than material deposition alone. Almost all other rapid prototyping processes are purely additive: material is deposited in the desired final or "net" shape. As a consequence, such processes require compromises between materials with good properties and materials which can be deposited to net shape. SDM allows materials to be optimized for excellent properties, without regard to net-shape deposition. This is possible because the final geometry will be machined into the part material, or replicated from machined support material. As a result, a broader range of materials can be processed using SDM than is possible using other layered manufacturing techniques.

However, SDM is limited in the range of materials which it can use by various requirements of the process. For example, the method requires that sequentially deposited part layers adhere to each other. Consequently, materials which do not adhere to themselves (or adhere poorly) cannot be used in the SDM process for directly making ceramic or polymer parts. Moreover, SDM generates parts having a layered structure. Such layered parts may tend to have more defects than monolithic parts due to trapped particles, incomplete interlayer bonding, and voids. Defects at interlayer boundaries are particularly problematic for ceramic parts.

The present invention makes use of the advantages of SDM relative to other layered manufacturing processes, and at the same time allows the manufacture of complex monolithic parts. The present invention extends the advantages of the SDM process to the manufacture of complex monolithic ceramic, metal and polymer parts, which could not be otherwise built by SDM.

FIG. 1 illustrates manufacturing steps used to make a ceramic molded part 64 in a preferred embodiment of the present invention. Molded part 64 has a complex shape containing both undercut and non-undercut features which would require a complicated conventional mold for injection molding. To make part 64, a mold 50 is first made using modified techniques derived from those employed in Shape Deposition Manufacturing (SDM) (steps 1–8). Mold 50 is built in conjunction with a temporary support part 51, to generate an assembly 46. Temporary support part 51 is removed (by liquefying) from mold 50 (step 9). Molded part 64 is then built by pouring or injecting casting material 53 into mold cavity 52 (steps 10–11), and processing (machining, drying and sintering a green part 54) following removal of mold 50 (steps 12–14).

A substrate 20 is placed on a pallet (work surface) 21 (step 1). Substrate 20 is made of mold material, and defines the bottom surfaces of mold cavity 52 and green part 54. Multiple layers 36a–d, each consisting of mold material and (optionally) complementary support material, are then sequentially deposited on top of substrate 20. The mold material defines mold 50, while the support material defines temporary support part 51.

A segment 22 of mold material is deposited on substrate 20 (step 2). In step 3, a segment 24 of support material is deposited onto substrate 20, filling an aperture defined by segment 22. Preferably, the mold material (segment 22) is a water-insoluble wax, while the support material (segment 24) is a water-soluble soldermask. Segment 22 is preferably poured, and allowed to cool after being poured. Segment 24 is preferably extruded as a bead into the aperture defined by segment 22, exposed to ultraviolet light, and allowed to cool.

The deposition process and associated steps generally depend on the materials used and desired part parameters; various techniques such as pouring, casting, extruding, dripping, spraying and sputtering may be suitable for material deposition, as is apparent to the skilled artisan. Various pre-deposition (e.g. substrate cleaning, preheating, surface activation) and post-deposition (e.g. curing, heating, cooling, exposure to light or radiation) steps may also be suitable, depending on the materials used. Generally suitable deposition techniques and associated steps for a wide variety of materials are well known in the art.

Following deposition of segment 24, segment 24 is shaped using a shaping means 30 to define a mold surface 26. Shaping means 30 preferably comprises, for example, a three- or five-axis CNC milling device. Other shaping techniques such as turning and electric discharge machining (EDM) may also be suitable for use in a method of the present invention, depending on desired materials and shapes. Mold surface 26 is an undercut internal surface of mold 50. Shaping ensures that all internal and external surfaces of part 64 are smooth, and not stairstepped. Segments 22 and 24 substantially define layer 36a.

In step 4, a segment 32 of mold material is deposited onto part of layer 36a, and is then shaped using shaping means 30 to define a non-undercut internal mold surface 33. A segment 34 of support material is deposited in the aperture defined by segment 32 and shaped (step 5). Segments 32 and 34 define layer 36b. Segments 38, 40 are then deposited and shaped as described above to define layer 36c (steps 6–7). A final segment 44 of mold material is deposited onto layer 36c, for defining the upper surface of part 54 while leaving an access aperture above support part 51 (step 8). Final segment 44 defines the final layer 36d. Mold 50 in conjunction with temporary support part 51 define assembly 46. It is noted that layers 36a, 36b, 36c, 36d need not be planar. The layers can be wedge-shaped with a tapered thickness or have an uneven, undulating thickness, or even a curved shape. Also, the different layers 36a, 36b, 36c, 36d can have different thicknesses (e.g. layer 36d is thicker than layers 36a, 36b, and 36c).

Non-undercut mold surfaces such as surface 33 are preferably shaped directly, while the shapes and smoothness of undercut mold surfaces such as surface 26 are controlled by shaping the corresponding surfaces of support segments. Vertical walls may be treated as undercut or non-undercut surfaces, as desired.

In step 9, temporary support part 51 is removed from mold 50 to generate a mold cavity 52, preferably by liquefying (e.g. dissolving or melting) temporary support part 51 while keeping mold 50 intact. Casting material/fluid (slurry) 53 is mixed and deaired, and cast into mold cavity 52, preferably under vacuum (step 10). Optionally, mold 50 and casting material 53 are then pressurized to shrink any bubbles in the casting material 53. After curing of its binder (step 11), material 53 becomes a monolithic hardened "wet" green ceramic part 54 within mold 50. Wet part 54 contains solvent from casting fluid 53.

Mold 50 is removed from around green part 54, preferably by liquefying mold 50 without damaging part 54 (step 12). Green part 54 is heated or dried to remove the solvent from casting fluid 53, and shaped (preferably machined) to remove any undesired protrusions such as the sprue and runner system used to pour gelcasting fluid 53 into mold cavity 52 (step 13). Generally, part 54 may be shaped before or after the removal of mold 50, and may be dried anytime after the removal of mold 50 (e.g. before or after shaping). A green part 62 of final shape is then defined (e.g. by machining or cutting away undesired portions). In step 14, green part 62 is heated to burn out its polymer binder, sintered, and finish-ground if necessary to generate part 64.

All processing steps are preferably performed on pallet 21, which can be located accurately and repeatably. For example, it is preferable to green-machine part 54 while still attached to pallet 21 (i.e. in step 11), without re-referencing machine tools. Attachment to pallet 21 allows for very accurately machining part 54, since part 54 need not be realigned with machine tools after its manufacture. The sprue and runner systems from part 54 are also more easily and accurately removed this way. However, part 54 can also be machined after mold 50 is removed and part 54 is no longer attached to pallet (i.e. in step 13).

As discussed above, directly-machined features can be more accurate than features replicated from molds. The entire process described above is preferably performed automatically, under the control of software (including CAD software) specifying the geometry of each layer and other process parameters. Performing all steps on pallet 21 facilitates automation of the process. Automatically implementing processes such as the one described above is well known in the art. For an example of devices used in such automation see the above-cited U.S. Pat. No. 5,301,415.

The mold material is preferably an organic-solvent-soluble, water-insoluble thermoplastic wax. Alternatively, the mold material may be a low-melting-point (generally <200° C.) metal or alloy such as solder, a water-soluble wax, or a thermosetting or thermoplastic polymer. The support material is preferably a water-soluble, organic-solvent-insoluble thermosetting soldermask. Alternatively, the support material may be any material listed above as a potential mold material. Optimized mold and support material combinations can be developed for the use of different casting materials. Mold and support materials for gelcasting processes may differ from those for polymer casting processes, since steps such as curing the final part or removing the mold from the final part place distinct requirements on the mold material.

The mold and support materials must be amenable to sequential deposition and precise shaping by shaping means 30. Sequentially deposited layers of each material must adhere to one another, and each of the two materials must adhere to the other. Moreover, the two materials must be physically and chemically compatible during deposition and thereafter. Preferably, one of the support and mold materials is thermoplastic while the other is thermosetting. Alternatively, two thermoplastic or two thermosetting materials may be used. Thermoplastic materials are relatively easy to remove, but are susceptible to intermelting during deposition. Thermosetting materials are less likely to melt and change shape during deposition of a complementary material, but are generally harder to remove. A large number of materials may be generally suitable as mold and support materials.

The step of removing the support material (step 9) places a number of requirements on the mold and support materials. In particular, the mold and support materials are preferably chosen such that subjecting assembly 46 to a particular condition leads to liquefaction of temporary support part 51 while mold 50 remains intact. The condition can be a high temperature; the support material is then chosen to have a lower melting point than the mold material. The condition can also be exposure to a particular solvent such as an organic solvent, water, a base or an acid; the materials are then chosen such that the support material dissolves in the particular solvent while the mold material is insoluble in the solvent. For example, in step 9 assembly 46 is preferably exposed to water to dissolve the temporary support part 51; mold 50 is then insoluble in water such that it remains intact as temporary support part 51 is dissolved.

Casting material (fluid) 53 is preferably a ceramic gelcasting slurry (including alumina, silicon nitride, and others). Alternatively, it can be a metal gelcasting slurry (including stainless steels, tool steels, superalloys, and others) or castable polymer (including polyesters, epoxies, polyurethanes, polyurethane foams, and others). Both aqueous and nonaqueous gelcasting formulations can be used. Since casting material 53 is cast all at once, it is not subject to the requirement that successive layers adhere to one another. As is apparent to the skilled artisan, some process modifications relative to the process illustrated in FIG. 1 may be desirable according to the material being cast. For example, various temperatures, cure cycles, machining parameters, sintering profiles, and casting procedures may be suitable for particular mold and casting materials.

The characteristics desired for part 64 place restrictions on casting material 53. The steps of heating casting material 53 within mold 50 (step 11, suited for ceramic casting material) and of removing part 54 from mold 50 (step 12) place additional restrictions on the mold and casting materials. If casting material 53 is heated in step 11, the heating is performed so as not to damage mold 50. Moreover, the casting and mold materials are chosen such that mold 50 can be dissolved or melted in step 12 (removed from part 54 without applying a force), leaving part 54 intact.

A method of the present invention can be used to manufacture molded parts of a wide variety of complex shapes. Through the use of multiple delivery outlets (e.g. sprue and runner systems), the present invention allows making assembled devices comprising different parts and/or different materials. FIG. 2-A is a schematic diagram of a process for making a heterogeneous part comprising interlocking (but not directly connected) sections.

An assembly 246 is made as described above (step 1) Assembly 246 comprises a mold 250 of mold material, and unconnected, distinct first and second sections 251a–b of temporary support material. Each section 251a–b is separately accessible from the top through apertures in mold 250. Sections 251a–b are removed, leaving mold 250 in isolation (step 2). Using separate delivery devices, distinct first and second casting materials 253a–b are cast respectively in the apertures left after the removal of sections 251a–b (steps 3–4). A final part 264 is produced after removing mold 250 and associated processing (step 5). Part 264 comprises distinct unconnected sections 265a–b which are interlocked together (assembled).

FIG. 2-B illustrates a manufacturing process suitable for making a heterogeneous part comprising directly connected sections of distinct materials. An assembly 346 comprising a mold 350 of mold material, and distinct unconnected sections 351a–b of temporary support material is made as described above (step 1).

Section 351b is completely embedded in mold 350, and is not directly accessible from the outside of mold 350. Section 351a is removed from mold 350a which still contains section 351b (step 2). A first casting material 353a is cast into the cavity left following the removal of section 351a, and allowed to harden (step 3). An access aperture 366 is then opened (e.g. drilled) through mold 350 to gain access to section 351b (step 4). Aperture 366 passes through mold 350 and material 353a. Section 351b is removed from mold 350b (step 5). A second casting material 353b is cast into the cavity left by the removal of section 351b, and allowed to harden (step 6). A final part 364 is produced following the removal of mold 350 and associated processing (step 7). Part 364 comprises distinct sections 365a–b which are directly connected at an attachment point 366.

Particular care is preferably taken in processing heterogeneous parts. Compromise sintering schedules may be required for multi-material metal and/or ceramic parts.

A method of the present invention allows complicated parts to be made via gelcasting without the need for direct or indirect metal tooling. Parts made according to the present invention can be made with shorter leadtimes than required for injection molding of ceramic parts. A method of the present invention is therefore particularly useful for the prototyping of ceramic parts, even for parts which could be made through injection molding. Through the use of castable polymeric resins, the method of the present invention produces functional polymeric parts with smooth surfaces. Furthermore, a method of the present invention allows the production of molds with internal cavities and fine details without requiring manual removal of support structures or manual assembly of separate sections into complete molds.

The present invention allows making fugitive gelcasting molds directly, rather than by replication from other molds.

The present invention produces wax fugitive molds with smoother surfaces than are possible through other rapid prototyping methods. Ceramic green parts made using the present invention are monolithic, eliminating the possibility of defects at interlayer boundaries present in green parts made via other rapid prototyping techniques.

Particularly useful applications of the present invention include the production of small-batch quantities of high-value parts such as complicated ceramic objects containing internal passages. Such parts are commonly employed in the aerospace industry—examples include turbine blades with small internal cooling channels. The present invention is suitable for the manufacture of prototype ceramic parts of high-temperature structural ceramic materials such as alumina and silicon nitride. A particular example is the prototyping or limited production of ceramic turbine blades. The invention is also suited for making complex parts through the use of metal gelcasting slurries, and castable polymers. The method allows the prototyping of complex parts which would be difficult or impossible to remove from non-fugitive molds.

The following examples are intended to illustrate the invention, and should not be construed to limit the invention.

EXAMPLE 1

The method of the present invention was used to make alumina impellers. FIG. 3-A shows a simplified perspective view of such an impeller 100 comprising a flat horizontal top member 102, a bottom member 106 parallel to top member 102, and substantially vertical members 104 connecting top member 102 and bottom member 106. During operation of impeller 100, members 104 interact with a fluid. An internal aperture (cavity) 108 is defined between top member 102, bottom member 106, and adjacent members 104. FIG. 3-B shows a sectional view through the middle of impeller 100. Curvatures of members 104 are not shown for simplicity.

The ceramic impellers were made in molds made of wax, using a mix of ultraviolet-curable soldermasks as temporary support material to support the molds. The mold material was Kindt-Collins Master File-a-wax. The support material was a soldermask consisting of a mix of ElectroLite ELC 4497 soldermask (4 parts) and Dymax 9-20311F soldermask (1 part). After constructing the mold in a layered fashion, the support material was removed by dissolving it in water. A gelcasting ceramic material containing alumina (provided by Advanced Ceramics Research, of Tucson, Ariz.) was then cast into the mold and vacuum deaired. To cure the polymer binder, the mold was heated to 100° C. for a period of time. After the binder was cured, the wax mold was removed by first melting off most of the wax, and then dissolving the rest in a heated solvent (Petroferm BioAct 280 at 105° C.). Finally, the green ceramic parts were sent to Advanced Ceramics Research for drying and sintering.

EXAMPLE 2

A method of the present invention was used to make turbine parts from a castable polyurethane material. These polymer parts were also made in molds made of wax, using a mix of ultraviolet-curable soldermasks as temporary support material. The mold material wax was a mixture of Kindt-Collins Protowax (75%) and Kindt-Collins Master File-a-wax (25%). The support soldermask used was a mix of ElectroLite ELC 4497 soldermask (4 parts) and Dymax 9-20311F soldermask (1 part). After constructing the mold in a layered fashion, the soldermask support material was removed by dissolving it in water. A two-part castable polyurethane material (Adtech LUC4180) was cast into the mold and vacuum deaired. The polyurethane was allowed to cure for twelve hours, and the wax mold was removed by dissolving it in a heated solvent (Petroferm BioAct 280 at 75° C.). The polyurethane parts were then complete.

It will be clear to one skilled in the art that the above embodiments may be altered in many ways without departing from the scope of the invention.

What is claimed is:

1. A method of making a complex three-dimensional molded part, comprising the steps of:
    a) generating a mold by
        (i) sequentially depositing in a predetermined deposition fashion a plurality of mold layers each comprising mold material, at least one of said mold layers comprising a mold segment formed of said mold material and a support segment formed of support material, wherein said mold material being removing resistant against a first removing means and being removable by a second removing means, wherein said support material being removable by said first removing means;
        (ii) shaping a mold surface within a previously deposited mold layer of said plurality of mold layers by shaping at least one of said support segment and said mold segment prior to deposition of a subsequent mold layer above said support segment and said mold segment, said shaping including three dimensional material removal in correspondence with a predetermined configuration of said mold surface, said predetermined configuration being independent of said predetermined deposition fashion, and wherein said predetermined deposition fashion and said shaping provide final layers selected from the group consisting of:
            A) planar layers;
            B) non planar layers;
            C) wedge shaped layers;
            D) layers having an uneven thickness;
            E) layers having an undulating thickness;
            F) layers having a curved shape; and
            G) layers having different thicknesses;
        (iii) removing said support material from said mold by removing said support material by use of said first removing means;
    b) casting part material into said mold to produce said part; and
    c) removing said mold material by use of a second removing means, said second removing means not removing said part material.

2. The method of claim 1 wherein said part material comprises a gelcasting material.

3. The method of claim 2 wherein said gelcasting material comprises a ceramic gelcasting slurry.

4. The method of claim 2 wherein said gelcasting material comprises a metal gelcasting slurry.

5. The method of claim 1 wherein said part material comprises a polymer.

6. The method of claim 1 wherein step (iii) comprises dissolving said support material.

7. The method of claim 1 wherein step (iii) comprises melting said support material.

8. The method of claim 1 further comprising a step of removing said part by liquefying said mold after step (b).

9. The method of claim 8 wherein said step of removing said part comprises dissolving said mold.

10. The method of claim 8 wherein said step of removing said part comprises melting said mold.

11. The method of claim 1 wherein step (ii) comprises shaping said support segment to define an undercut surface of said mold.

12. The method of claim 11 further comprising a step of shaping said mold segment to define a non-undercut surface of said mold.

13. The method of claim 1 wherein step (ii) comprises shaping said mold segment to define a non-undercut surface of said mold.

14. The method of claim 1 wherein the support material is ultraviolet-curable, water-soluble polymer.

15. A method of making a complex three-dimensional molded part, comprising the steps of:
 a) depositing a mold segment formed of mold material in a predetermined deposition fashion, wherein said mold material being removing resistant against a first removing means and being removable by a second removing means;
 b) primary shaping said mold segment within a deposition height of said mold segment, wherein said primary shaping includes three dimensional material removal in correspondence with a predetermined configuration of said mold surface, said predetermined configuration being independent of said predetermined deposition fashion,;
 c) depositing a support segment formed of support material in said predetermined deposition fashion, wherein said support material being removable by said first removing means;
 d) secondary shaping said support segment within a deposition height of said support segment, wherein said secondary shaping includes three dimensional material removal in correspondence with at least one of said predetermined configuration and a predetermined support for at least one of a consecutively deposited mold segment and a consecutively deposited support segment;
 e) sequentially repeating steps (a), (b), (c), and (d) to generate a plurality of mold layers forming said mold, wherein said predetermined deposition fashion, said primary shaping and said secondary shaping provide final layers selected from the group consisting of:
  A) planar layers;
  B) non planar layers;
  C) wedge shaped layers;
  D) layers having an uneven thickness;
  E) layers having an undulating thickness;
  F) layers having a curved shape; and
  G) layers having different thicknesses;
 f) after forming said mold, removing said support material from said mold by removing said support material with said first removing means;
 g) after step (f), casting part material into said mold;
 h) after step (g), solidifying said part material to form said part; and
 i) after step (h), removing said part by removing said mold with said second removing means.

16. The method of claim 15 wherein said part material comprises a gelcasting material.

17. The method of claim 16 wherein said gelcasting material comprises a ceramic gelcasting slurry.

18. The method of claim 16 wherein said gelcasting material comprises a metal gelcasting slurry.

19. The method of claim 15 wherein said part material comprises a polymer.

20. The method of claim 15 wherein step (f) comprises dissolving said support material.

21. The method of claim 15 wherein step (f) comprises melting said support material.

22. The method of claim 15 wherein step (i) comprises dissolving said mold.

23. The method of claim 15 wherein step (i) comprises melting said mold.

24. The method of claim 15 wherein step (d) comprises shaping said support segment to define an undercut surface of said mold.

25. The method of claim 24 wherein step (b) comprises the step of shaping said mold segment to define a non-undercut surface of said mold.

26. The method of claim 15 wherein step (b) comprises shaping said mold segment to define a non-undercut surface of said mold.

27. The method of claim 15 wherein the support material is ultraviolet-curable, water-soluble polymer.

28. A method of rapid-prototyping a mold for a complex three-dimensional part, comprising the steps of:
 a) sequentially depositing in a predetermined deposition fashion a plurality of mold layers each comprising mold material, at least one of said mold layers comprising a mold segment formed of said mold material and a support segment formed of support material, wherein said mold material being removing resistant against a removing means and wherein said support material being removable by said removing means;
 b) shaping a mold surface within a previously deposited mold layer of said plurality of mold layers by shaping at least one of said support segment and said mold segment prior to deposition of a subsequent mold layer above said support segment and said mold segment, to define a surface of said mold, said shaping including three dimensional material removal in correspondence with a predetermined configuration of said mold surface, said predetermined configuration being independent of said predetermined deposition fashion, and wherein said predetermined deposition fashion and said shaping provide final layers selected from the group consisting of:
  A) planar layers;
  B) non planar layers;
  C) wedge shaped layers;
  D) layers having an uneven thickness;
  E) layers having an undulating thickness;
  F) layers having a curved shape; and
  G) layers having different thicknesses; and
 c) removing said support material from said mold by removing said support material with said removing means.

29. The method of claim 28 wherein step (c) comprises dissolving said support material.

30. The method of claim 28 wherein step (c) comprises melting said support material.

31. The method of claim 28 wherein step (b) comprises shaping said support segment to define an undercut surface of said mold.

32. The method of claim 31 further comprising a step of shaping said mold segment to define a non-undercut surface of said mold.

33. The method of claim 28 wherein step (b) comprises shaping said mold segment to define a non-undercut surface of said mold.

34. The method of claim 28 wherein the support material is ultraviolet-curable, water-soluble polymer.

35. A rapid-prototyping method comprising the steps of:
a) generating a mold by
   (i) sequentially depositing in a predetermined deposition fashion a plurality of mold layers each comprising mold material, at least one of said mold layers comprising a mold segment formed of said mold material and a support segment formed of support material, such that said support material forms a plurality of distinct support sections enclosed by said mold material, said plurality of support sections defining a corresponding plurality of distinct cavities in said mold, wherein said mold material being removing resistant against a removing means;
   (ii) shaping a mold surface within a previously deposited mold layer of said plurality of mold layers by shaping at least one of said support segment and said mold segment prior to deposition of a subsequent mold layer above said support segment and said mold segment, to define said mold surface, said shaping including three dimensional material removal in correspondence with a predetermined configuration of said mold surface, said predetermined configuration being independent of said predetermined deposition fashion, and wherein said predetermined deposition fashion and said shaping provide final layers selected from the group consisting of:
      A) planar layers;
      B) non planar layers;
      C) wedge shaped layers;
      D) layers having an uneven thickness;
      E) layers having an undulating thickness;
      F) layers having a curved shape; and
      G) layers having different thicknesses;
   (iii) removing said support material from said mold by removing said support material with said removing means, thereby providing said plurality of cavities in said mold;
b) casting part material into said plurality of cavities to form a part comprising a plurality of part sections corresponding to said plurality of cavities; and
c) solidifying said part material.

36. The method of claim 35 wherein said plurality of support sections are interlocked, whereby said plurality of part sections are interlocked.

37. The method of claim 35 wherein said part material comprises a gelcasting material.

38. The method of claim 37 wherein said gelcasting material comprises a ceramic gelcasting slurry.

39. The method of claim 37 wherein said gelcasting material comprises a metal gelcasting slurry.

40. The method of claim 35 wherein said part material comprises a polymer.

41. The method of claim 35 wherein step (iii) comprises dissolving said support material.

42. The method of claim 35 wherein step (iii) comprises melting said support material.

43. The method of claim 35 further comprising a step of removing said part by liquefying said mold after step (c).

44. The method of claim 43 wherein said step of removing said part comprises dissolving said mold.

45. The method of claim 43 wherein said step of removing said part comprises melting said mold.

46. The method of claim 35 wherein step (ii) comprises shaping said support segment to define an undercut surface of said mold.

47. The method of claim 46 further comprising a step of shaping said mold segment to define a non-undercut surface of said mold.

48. The method of claim 35 wherein step (ii) comprises shaping said mold segment to define a non-undercut surface of said mold.

49. The method of claim 35 wherein said part material comprises different materials in different cavities.

50. The method of claim 35 wherein the support material is ultraviolet-curable, water-soluble polymer.

51. A rapid-prototyping method comprising the steps of:
a) generating a mold by
   (i) sequentially depositing in a predetermined deposition fashion a plurality of mold layers each comprising mold material, at least one of said mold layers comprising a mold segment formed of said mold material and a support segment formed of support material, such that said support material forms a first support section and a second support section, said first support section being distinct from said second support section, said support sections being enclosed by said mold material, wherein said mold material being removing resistant against a first removing means and being removable by a second removing means, and wherein said support material being removable by said first removing means;
   (ii) shaping a mold surface within a previously deposited mold layer of said plurality of mold layers by shaping at least one of said support segment and said mold segment prior to deposition of a subsequent mold layer above said support segment and said mold segment, to define a surface of said mold, said shaping including three dimensional material removal in correspondence with a predetermined configuration of said mold surface, said predetermined configuration being independent of said predetermined deposition fashion, and wherein said predetermined deposition fashion and said shaping provide final layers selected from the group consisting of:
      G) planar layers;
      H) non planar layers;
      I) wedge shaped layers;
      J) layers having an uneven thickness;
      K) layers having an undulating thickness;
      L) layers having a curved shape; and
      M) layers having different thicknesses;
b) removing with said first removing means said first support section to open said first mold cavity;
c) casting said first part-forming material into said first mold cavity to form a first part section;
d) solidifying said first part-forming material in said first mold cavity;
e) secondarily shaping an access aperture connecting said first part section and said second mold cavity defined by said second support section enclosed by said mold;
f) removing with said first removing means said second support section through said access aperture to open said second mold cavity;
g) casting a second part-forming material into said second mold cavity and said access aperture to form a second part section connected to said first part section; and
h) solidifying said second part-forming material.

52. The method of claim 51 wherein said first part-forming material and said second part-forming material consist of different materials.

53. The method of claim 51 wherein said first part-forming material comprises a gelcasting material.

54. The method of claim 53 wherein said gelcasting material comprises a ceramic gelcasting slurry.

55. The method of claim 53 wherein said gelcasting material comprises a metal gelcasting slurry.

56. The method of claim 51 wherein said first part-forming material comprises a polymer.

57. The method of claim 51 wherein said second part-forming material comprises a gelcasting material.

58. The method of claim 57 wherein said gelcasting material comprises a ceramic gelcasting slurry.

59. The method of claim 57 wherein said gelcasting material comprises a metal gelcasting slurry.

60. The method of claim 51 wherein said second part-forming material comprises a polymer.

61. The method of claim 51 wherein step (b) comprises dissolving said first support section.

62. The method of claim 51 wherein step (b) comprises melting said first support section.

63. The method of claim 51 wherein step (e) comprises dissolving said second support section.

64. The method of claim 51 wherein step (e) comprises melting said second support section.

65. The method of claim 51 further comprising a step of liquefying said mold after step (g).

66. The method of claim 65 wherein said step of liquefying comprises dissolving said mold.

67. The method of claim 65 wherein said step of liquefying comprises melting said mold.

68. The method of claim 51 wherein the support material is ultraviolet-curable, water-soluble polymer.

69. The method of claim 1, 15, 28, 35 or 51, wherein said predetermined deposition fashion includes:
   a) deposition of a first of said mold layers with a first thickness that is predetermined equal to at least one other of said mold layer, and wherein said first thickness being constant within said layer;
   b) deposition of a second of said deposition layers with a second thickness varying relative to at least one other of said mold layer;
   c) deposition of a third of said mold layers having a planar bottom surface and a top surface shaped in correspondence with a feature contour of said mold shape;
   d) deposition of a fourth of said mold layers having a planar top surface and a bottom surface shaped in correspondence with a feature contour of said mold shape; and
   e) deposition of a fifth of said mold layers having a top surface and a bottom surface shaped in correspondence with feature contours of said mold shape.

70. The method of claim 1 or 15, wherein said first removing means is a thermal removing means providing melting.

71. The method of claim 1 or 15, wherein said first removing means is a non-thermal dissolving means providing dissolving.

72. The method of claim 71, wherein said non-thermal dissolving means is water based.

73. The method of claim 71, wherein said non-thermal dissolving means is an organic solvent.

74. The method of claim 1 or 15, wherein said second removing means is a thermal removing means providing melting.

75. The method of claim 1 or 15, wherein said second removing means is a non-thermal dissolving means providing dissolving.

76. The method of claim 75, wherein said non-thermal dissolving means is water based.

77. The method of claim 75, wherein said non-thermal dissolving means is an organic solvent.

78. The method of claim 28, 35 or 51, wherein said removing means is a thermal removing means providing melting.

79. The method of claim 28, 35 or 51, wherein said removing means is a non-thermal dissolving means providing dissolving.

80. The method of claim 79, wherein said non-thermal dissolving means is water based.

81. The method of claim 79, wherein said non-thermal dissolving means is an organic solvent.

82. The method of claim 1, 15, 28, 35, or 51, wherein said shaping is selected from the group consisting of three to five axis milling, turning and electrical discharge machining.

83. The method of claim 51, wherein said first part-forming material and said second part-forming material are identical.

* * * * *